(12) United States Patent
Rodrigues et al.

(10) Patent No.: US 11,091,990 B2
(45) Date of Patent: Aug. 17, 2021

(54) UNDERWATER SYSTEM AND METHOD FOR PRESSURIZATION OF AN UNDERWATER OIL RESERVOIR BY INDEPENDENT INJECTION OF WATER AND GAS

(71) Applicant: PETRÓLEO BRASILEIRO S.A.—PETROBRAS, Rio de Janeiro (BR)

(72) Inventors: Roberto Rodrigues, Rio de Janeiro (BR); Carlos Alberto Bandeira Ribeiro Cardoso, Rio de Janeiro (BR)

(73) Assignee: PETRÓLEO BRASILEIRO S.A.—PETROBRAS, Rio de Janeiro (BR)

( * ) Notice: Subject to any disclaimer, the term of this patent is extended or adjusted under 35 U.S.C. 154(b) by 0 days.

(21) Appl. No.: 16/753,988

(22) PCT Filed: Oct. 5, 2018

(86) PCT No.: PCT/GB2018/052853
§ 371 (c)(1),
(2) Date: Apr. 6, 2020

(87) PCT Pub. No.: WO2019/069094
PCT Pub. Date: Apr. 11, 2019

(65) Prior Publication Data
US 2020/0392823 A1 Dec. 17, 2020

(30) Foreign Application Priority Data
Oct. 6, 2017 (BR) .......................... 102017021444-3

(51) Int. Cl.
*E21B 43/013* (2006.01)
*E21B 43/16* (2006.01)

(52) U.S. Cl.
CPC .......... *E21B 43/166* (2013.01); *E21B 43/013* (2013.01)

(58) Field of Classification Search
CPC ....... E21B 43/013; E21B 43/16; E21B 43/166
See application file for complete search history.

(56) References Cited

U.S. PATENT DOCUMENTS 4,052,703 A * 10/1977 Collins, Sr. ........... E21B 43/017
714/2
4,967,843 A * 11/1990 Corteville ............. E21B 43/121
166/366

(Continued)

FOREIGN PATENT DOCUMENTS

WO    WO 2008/007718 A1    1/2008

*Primary Examiner* — Matthew R Buck
(74) *Attorney, Agent, or Firm* — Birch, Stewart, Kolasch & Birch, LLP

(57) ABSTRACT

A system for pressurization of an underwater oil reservoir by independent injection of water and gas comprise: at least first and second underwater injection wells, wherein at least one of the first and second underwater injection wells is linked to a production unit by means of an individual underwater line; and at least two jumpers: a first jumper hydraulically connecting a wet Christmas tree of the first underwater injection well to a wet Christmas tree of the second underwater injection well, and a second jumper hydraulically the wet Christmas tree of the second underwater injection well to the wet Christmas tree of the first underwater injection well.

20 Claims, 2 Drawing Sheets

(56) References Cited

U.S. PATENT DOCUMENTS

| | | | |
|---|---|---|---|
| 10,815,777 B2* | 10/2020 | Collins | G01N 33/2823 |
| 10,890,044 B2* | 1/2021 | Vincent | E21B 47/06 |
| 2004/0244980 A1* | 12/2004 | Appleford | E21B 43/18 |
| | | | 166/305.1 |
| 2005/0178556 A1* | 8/2005 | Appleford | E21B 43/017 |
| | | | 166/366 |
| 2006/0231266 A1 | 10/2006 | Rodrigues et al. | |
| 2009/0314495 A1 | 12/2009 | Schott, III et al. | |
| 2017/0145800 A1 | 5/2017 | Davidsen et al. | |
| 2018/0135400 A1* | 5/2018 | Sommerfield | E21B 43/01 |

\* cited by examiner

UNDERWATER SYSTEM AND METHOD FOR PRESSURIZATION OF AN UNDERWATER OIL RESERVOIR BY INDEPENDENT INJECTION OF WATER AND GAS

CROSS-REFERENCE TO RELATED APPLICATION

This application claims the benefit of priority to BR 10 2017 021444-3, filed 6 Oct. 2017, which is incorporated herein by reference in its entirety.

FIELD OF THE INVENTION

The present invention relates to the injection of fluids in oil reservoirs to maintain the pressure. More particularly, the present invention relates to the injection of water and gas, simultaneously or alternately, in underwater wells to increase production and to increase the oil recovery factor.

BACKGROUND OF THE INVENTION

In offshore oil production, as the reservoirs are produced, the pressure in them decreases. In order to allow continuity of production, various techniques exist for secondary oil recovery, among which we may mention injection of water to minimize the deficit in the balance of materials and thus keep the reservoir pressure as close as possible to the original pressure. Studies of production of deep-water oil fields with high gas-oil ratios, for example those located in the Brazilian pre-salt area, identified the opportunity of increasing the reservoir recovery factors, using for this the method of alternating injection of gas and water in the same well and at the same point of the reservoir, known as WAG (Water-Alternating-Gas). This method is used in various onshore fields throughout the world, but is little used in offshore fields. Depending on the type of reservoir, the WAG method may give better oil recovery indices compared to the method of injecting water alone. There are some variants of the WAG method, including those with simultaneous injection of gas and water in one and the same well.

An opportunity for WAG injection with $CO_2$-rich gas has arisen in Brazil, mainly in the recent discoveries of large oil reserves in the pre-salt layer. Much of the oil contained in the pre-salt carbonate reservoirs is light, with a density in the range from 28 to 30° API (American Petroleum Institute), with a high content of gases, a gas-oil ratio above 200 $m^3/m^3$, and containing between 8 and 20% of $CO_2$, which makes the use of gas for advanced oil recovery an attractive possibility. Reinjection of the gas produced, containing $CO_2$, by the WAG injection method, has good prospects of increasing the oil recovery factor of these reservoirs, besides mitigating the release of greenhouse gases. Application of this technique in deep waters is a challenge.

A problem inherent in petroleum production at great depths, as well as in systems for injection of gas and water in one and the same well, relates to the risk of pipeline obstruction by hydrate formation, the result of direct contact of gas and water in conditions of high pressure and low temperature. Another problem in using one line for alternating flow of gas and water if the gas contains a percentage of $CO_2$ above 1%, is the need for special metallurgy and operating procedures with switching of fluid through displacement of plugs of inert fluids, avoiding not only hydrate formation, but also reaction of $CO_2$ with water forming carbonic acid, a substance that is highly corrosive.

To get round problems of corrosion of lines and risks of hydrate, in the development of the first subsea fields in deep waters of the Brazilian pre-salt, a flexible system was designed that allowed injection of water only or alternating injection of water and gas (WAG method), with facilities for switching the fluid injected and consequently mitigating the risk of hydrate formation. Therefore a subsea manifold system for injection of water and gas (Manifold Submarino de Injecao de Água e Gás, MSIAG) was developed that operates connected to two underwater injection wells. In this system, the manifolds are responsible for controlling the injection of gas and/or water in the wells. The MSIAG gave an economic result, taking into account the capital costs and operating costs (CAPEX and OPEX), better than the interconnection of two independent satellite WAG wells.

Despite the merits of this design, these manifolds had a high capital cost, of the order of 30 million dollars, besides the cost of the underwater lines and the operating costs. There is therefore a need to develop new solutions that provide maintenance of reservoir pressure in production.

There is therefore interest in finding other solutions with a better cost-benefit ratio, without requiring manifolds, for providing injection by the WAG method in scenarios as described above. For this purpose, multifunctional underwater systems, i.e. that combine alternating injection of water and gas to increase the reservoir recovery factor with greater robustness of mitigation of hydrates, and still with the possibility of injecting water collected directly from the sea bottom, may become attractive.

The document with the title "Advanced Oil Recovery: Potential for WAG Injection (Water Alternating Gas)", by ROSA, K. R. S. A., Bezerra, M. C. M., Ponzio, E. A. and Rocha, A. A., published by the Rev. Virtual Quim. in 2016, describes a study of oil recovery using the techniques of WAG injection. However, nothing is mentioned concerning the possibility of underwater injection in injection wells without the need to use a manifold for controlling injection.

In order to solve the problems of the prior art mentioned above, document PCT/BR2017/000093, filed by this same applicant, describes an underwater system for pressurization of an underwater oil reservoir by injecting water and/or gas, comprising (i) at least two underwater injection wells, each underwater injection well being linked to a production unit by means of an individual underwater line that is connected to the respective underwater injection well via a main injection mandrel, and (ii) at least one jumper, each jumper hydraulically connecting two of the at least two adjacent underwater injection wells via annulus and auxiliary mandrels.

However, the injection system described in document PCT/BR2017/000093 allows the alternating injection of gas and water in injection to be carried out necessarily in the same injection pipeline. In other words, it is necessary for both injection pipelines to be designed and prepared for alternating injection of water and gas.

In this case, each pipeline of the system described in document PCT/BR2017/000093 must be dimensioned for injection of both water and gas. However, it is known that in alternating injections of water and gas ($CO_2$) there is inevitably mixing of these elements, forming acid that will reduce the useful life of the pipeline.

An alternative that prolongs the useful life of the injection pipelines in systems of the WAG type is injection of a plug of an inert fluid, generally diesel oil, between the portions of gas and water. However, management of the injection of gas, water and diesel alternately in one and the same pipeline ends up increasing the logistics costs of the system and reducing the useful life of the pipelines. Moreover, each pipeline will have to be designed for conveying different types of fluid, increasing the cost of design and manufacture.

As will be described in more detail below, the present invention aims to at least partially solve the problems of the prior art described above in a practical and efficient manner.

SUMMARY OF THE INVENTION

The present document provides an integrated recovery system by injection of gas and water that makes an underwater manifold unnecessary.

The document further discloses an integrated recovery system by injection of gas and water endowed with greater robustness to hydrates.

The document further discloses an integrated recovery system by injection of gas and water capable of injecting water collected and treated directly from the sea bottom.

The document further discloses an integrated recovery system by injection of gas and water that allows each injection pipeline to be responsible for injecting only water or gas, dispensing with the need for injection of inert fluid between the portions of water and gas.

The document further discloses an integrated recovery system by injection of gas and water that makes it possible to carry out operations for recovery of injectivity of the wells by means of operations carried out from a well intervention vessel, for example acidification.

According to a first aspect, the invention provides a system for pressurization of an underwater oil reservoir by independent injection of water and gas, the system comprising one or more of: at least first and second underwater injection wells, wherein at least one of the first and second underwater injection wells is linked to a production unit by means of an individual underwater line; and at least two jumpers: a first jumper hydraulically connecting a wet Christmas tree, WCT, of the first underwater injection well to a wet Christmas tree, WCT, of the second underwater injection well, and a second jumper hydraulically connecting the wet Christmas tree, WCT, of the second underwater injection well to the wet Christmas tree, WCT, of the first underwater injection well. The arrangement of the jumpers allows different fluids to be supplied to different wells, and then for those fluids to be distributed to other wells without those wells needing a direct link to the fluid source. As such, dedicated underwater lines can be provided for different fluids, such as water and gas, avoiding contamination and unwanted reaction products compared to using the same line under cyclic operation for the different fluids.

At least one of the underwater injection wells can be linked to the production unit by means of the individual underwater line via a main injection mandrel of the respective wet Christmas tree, WCT, of the at least one well. It is not necessary for all the wells to be linked, to the production unit, because the jumpers allow fluid to be redistributed amongst the wells.

The first jumper can hydraulically connect an auxiliary mandrel of the wet Christmas tree, WCT, of the first underwater injection well to an annulus mandrel of the wet Christmas tree, WCT, of the second underwater injection well. The second jumper can hydraulically connect an auxiliary mandrel of the wet Christmas tree, WCT, of the second underwater injection well to an annulus mandrel of the wet Christmas tree, WCT, of the first underwater injection well.

The system optionally comprises an underwater seawater collection and injection system, SI.

Optionally, the underwater seawater collection and injection system, SI, comprises one or more from the list of a suction pipe, a non-return valve, a filter, an injection pump and a suction valve.

Optionally, the underwater seawater collection and injection system, SI, is in fluidic communication with a main injection mandrel of the wet Christmas tree, WCT, of the first or second underwater injection well. The SI can thus directly provide water to an underwater injection well that is not connected to a production unit. The water can be distributed via the jumpers to other wells from there, meaning the system as a whole may not need to have a line for receiving water from the production unit.

Optionally, the underwater seawater collection and injection system, SI, is in fluidic communication with a main injection mandrel of the wet Christmas tree, WCT, of the first underwater injection well.

Optionally, the system is configured to inject only water through a first individual underwater line, which hydraulically connects either the production unit or the underwater seawater collection and injection system, SI, with the first underwater injection well. Optionally the system is configured to inject only gas through a second individual underwater line that hydraulically connects the production unit with the second underwater injection well. Accordingly, different lines are used for water and gas, avoiding contamination and unwanted reaction products compared to using the same line under cyclic operation for the different fluids.

Optionally, the first jumper is configured to only convey water from the wet Christmas tree, WCT, of the first underwater injection well to the wet Christmas tree, WCT, of the second underwater injection well. Optionally, the second jumper is configured to only convey gas from the wet Christmas tree, WCT, of the second underwater injection well to the wet Christmas tree, WCT, of the first underwater injection well.

Optionally, the system further comprises at least one measurement unit for management of the amounts of fluid, gas or water, injected in one or both of the first and second underwater injection wells.

According to a second aspect, the invention provides a method for pressurization of an underwater oil reservoir by independent injection of water and gas, the method using the system of the first aspect and comprising a step of: injecting at least one of water and gas in the first and/or second underwater injection well.

Optionally, the step of injecting at least one of water and gas is carried out either from the production unit or from the underwater collection and injection system, SI.

Optionally, the step of injecting at least one of water and gas comprises continuous or alternating injection of water or gas through individual underwater lines from the production unit, water being only injected via a first individual underwater line and gas being only injected via a second individual underwater line. Alternatively, the step of injecting at least one of water and gas comprises continuous or alternating injection of water or gas through individual underwater lines, water only being injected via a first individual underwater line from the underwater collection and injection system, SI, and gas only being injected via a second individual underwater line from the production unit. Both these alternatives allow dedicated lines to be used for the water and gas.

Optionally, the method further comprises a step of directing only water injected in the wet Christmas tree, WCT, of the first underwater injection well to the second underwater injection well through the first jumper. Optionally, the method further comprises a step of directing only gas injected in the wet Christmas tree, WCT, of the second underwater injection well to the first underwater injection well through the second jumper. Both of these options ensure that a dedicated jumper is used for the water or gas and thus avoids contamination and unwanted reactant build up that can occur when dedicated lines are not provided.

Optionally the method further comprises a step of control and measurement of flow rate of fluid, gas or water, injected in each of the first and second underwater injection wells.

there is also disclosed an underwater system for pressurization of an underwater oil reservoir by independent injection of water and gas, said system comprising (i) at least two underwater injection wells, wherein at least one of the underwater injection wells is linked to a production unit by means of an individual underwater line that is connected to the respective underwater injection well via a main injection mandrel of the respective wet Christmas tree of the well, and (ii) at least two jumpers, the first jumper hydraulically connecting an annulus mandrel of the WCT of the first underwater injection well to an auxiliary mandrel of the WCT of the second underwater injection well, and the second jumper hydraulically connecting an annulus mandrel of the WCT of the second underwater injection well to an auxiliary mandrel of the WCT of the first underwater injection well.

There is also disclosed an underwater method for pressurization of an underwater oil reservoir by independent injection of water and gas, said method comprising the step of injecting at least one of water and gas in at least one underwater injection well of a set formed from at least two underwater injection wells, wherein at least one of the underwater injection wells is linked to a production unit by means of an individual underwater line that is connected to the respective underwater injection well via a main injection mandrel of the respective wet Christmas tree (WCT) of the well, wherein at least two jumpers hydraulically connect two of the at least two adjacent underwater injection wells, the first jumper hydraulically connecting an annulus mandrel of the WCT of the first underwater injection well to an auxiliary mandrel of the WCT of the second underwater injection well, and the second jumper hydraulically connecting an annulus mandrel of the WCT of the second underwater injection well to an auxiliary mandrel of the WCT of the first underwater injection well, wherein the step of injecting at least one of water and gas in at least one underwater injection well is carried out from the production unit or from an underwater collection and injection system in fluidic communication with the at least one underwater injection well.

There is also disclosed an underwater system for pressurization of an underwater oil reservoir by independent injection of water and gas, characterized in that it comprises: at least two underwater injection wells (4, 5), wherein at least one of the underwater injection wells (4, 5) is linked to a production unit (11) by means of an individual underwater line (1, 2) that is connected to the respective underwater injection well (4, 5) via a main injection mandrel (6, 6') of the respective wet Christmas tree (WCT) of the well; and at least two jumpers (9, 10), the first jumper (10) hydraulically connecting an auxiliary mandrel (8) of the WCT of the first underwater injection well (4) to an annulus mandrel (7') of the WCT of the second underwater injection well (5), and the second jumper (9) hydraulically connecting an auxiliary mandrel (8') of the WCT of the second underwater injection well (5) to an annulus mandrel (7) of the WCT of the first underwater injection well (4).

Optionally, the system additionally comprises an underwater seawater collection and injection system (SI).

Optionally, the underwater seawater collection and injection system (SI) comprises at least one of suction pipe (17), non-return valve (18), filter (14), injection pump (15) and suction valve (16).

Optionally, the underwater seawater collection and injection system (SI) is in fluidic communication with the main injection mandrel (6, 6') of the WCT of one of the two adjacent underwater injection wells (4, 5).

Optionally, the underwater seawater collection and injection system (SI) is in fluidic communication with the main injection mandrel (6) of the WCT of the first underwater injection well (4).

Optionally, only water is injected through the first individual underwater line (1), which hydraulically connects to a production unit (11) or underwater seawater collection and injection system (SI) with the first underwater injection well (4).

Optionally, only gas is injected through the second individual underwater line (2) that hydraulically connects to a production unit (11) with the second underwater injection well (5).

Optionally, the first jumper (10) only conveys water from the WCT of the first underwater injection well (4) to the WCT of the second underwater injection well (5), the water being received from the production unit (11) or from the underwater seawater collection and injection system (SI).

Optionally, the second jumper (9) only conveys gas from the WCT of the second underwater injection well (5) to the WCT of the first underwater injection well (4), the gas being received from the production unit (11).

Optionally, the system is characterized by the use of a flow rate control and measurement unit 12 and 12' for management of the amounts of fluid, gas or water, injected in each well 4 and 5.

There is also disclosed an underwater method for pressurization of an underwater oil reservoir by independent injection of water and gas, characterized in that it comprises the step of: injecting at least one of water and gas in at least one underwater injection well (4, 5) of a set formed from at least two underwater injection wells (4, 5), wherein at least one of the underwater injection wells (4, 5) is linked to a production unit (11) by means of an individual underwater line (1, 2) that is connected to the respective underwater injection well (4, 5) via a main injection mandrel (6, 6') of the respective wet Christmas tree (WCT) of the well, in that at least two jumpers (9, 10) hydraulically connect two of the at least two adjacent underwater injection wells (4, 5), the first jumper (10) hydraulically connecting an auxiliary mandrel (8) of the WCT of the first underwater injection well (4) to an annulus mandrel (7') of the WCT of the second underwater injection well (5), and the second jumper (9) hydraulically connecting an auxiliary mandrel (8') of the WCT of the second underwater injection well (5) to an annulus mandrel (7) of the WCT of the first underwater injection well (4), in that the step of injecting at least one of water and gas in at least one underwater injection well (4, 5) is carried out from the production unit (11) or from an underwater collection and injection system (SI) in fluidic communication with the at least one underwater injection well (4, 5).

Optionally, the step of injecting at least one of water and gas in at least one underwater injection well (4, 5) comprises continuous or alternating injection of water or gas through different individual underwater lines (1, 2) from the production unit (11), water being injected via a first individual underwater line (1) and gas being injected via a second individual underwater line (2).

Optionally, the step of injecting at least one of water and gas in at least one underwater injection well (4, 5) comprises continuous or alternating injection of water or gas through different individual underwater lines (1, 2): water being injected via a first individual underwater line (1) from the underwater collection and injection system (SI), and gas being injected via a second individual underwater line (2) from the production unit (11).

Optionally, the method additionally comprises the step of directing water injected in the WCT of the first underwater injection well (4) to the second underwater injection well (5) through the first jumper (10).

Optionally, the method additionally comprises the step of directing gas injected in the WCT of the second underwater injection well (5) to the first underwater injection well (4) through the second jumper (9).

Optionally, the method additionally comprises the step of control and measurement of flow rate by the elements 12 and 12' for managing the amounts of fluid, gas or water, injected in each well 4 and 5.

BRIEF DESCRIPTION OF THE FIGURES

The detailed description presented hereunder refers to the appended figures and their respective reference numbers, showing the details of the present invention.

DETAILED DESCRIPTION OF THE INVENTION

Firstly, it is emphasized that the following description will be based on preferred embodiments of the invention. However, as will be obvious to a person skilled in the art, the invention is not limited to these particular embodiments.

Figure 1:
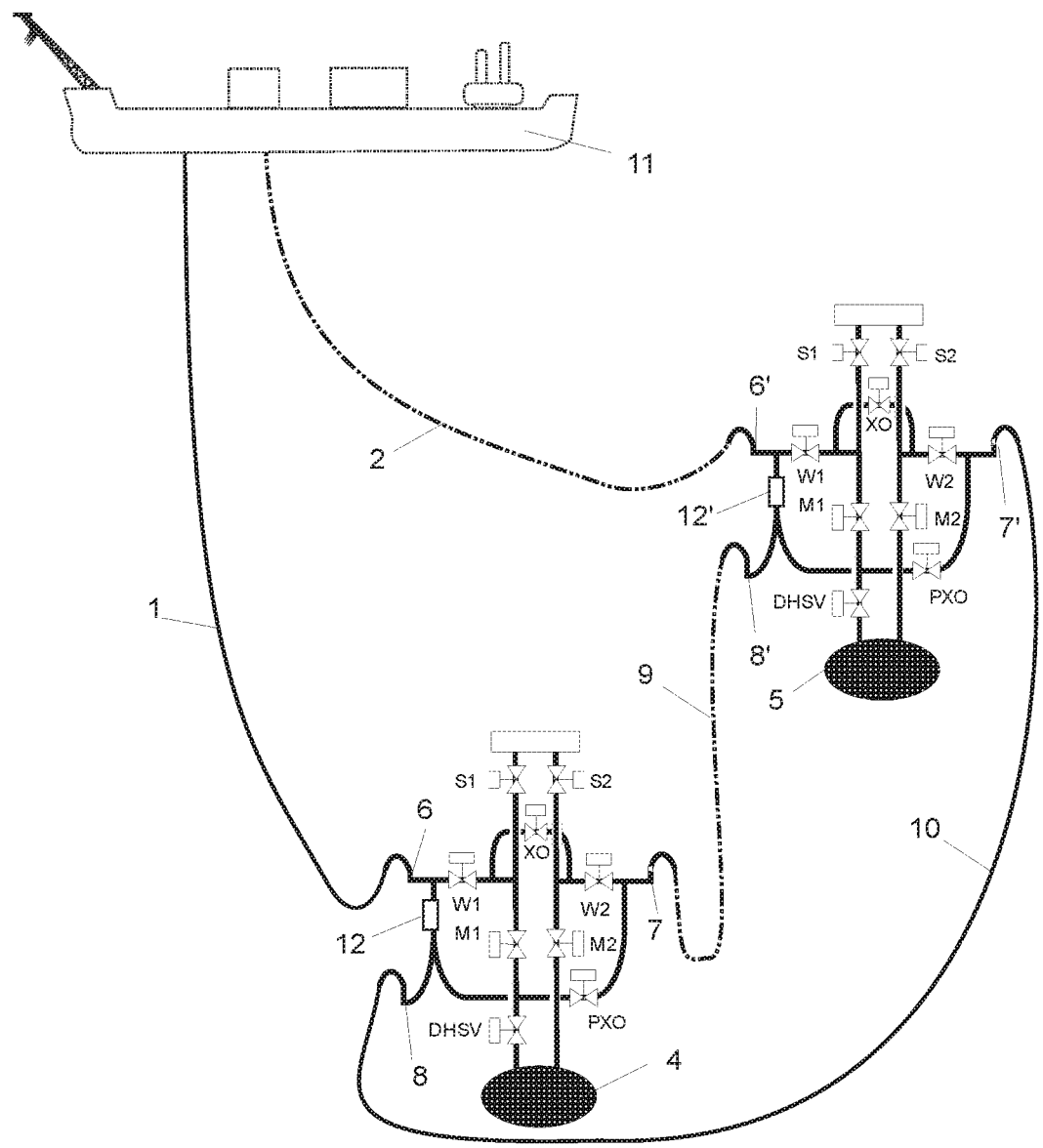
FIG. 1 shows a schematic view of a system, comprising a pair of injection wells hydraulically connected by two short underwater lines (jumpers).

In a first embodiment, illustrated in the schematic view in FIG. 1, two underwater injection wells 4, 5 are linked to a production unit 11, such as an FPSO (Floating Production Storage and Offloading). They are linked via their respective underwater injection lines 1, 2, which are connected to the respective main injection mandrels 6, 6' of each one of the WCTs (Wet Christmas Trees) of the underwater injection wells 4, 5. The wells 4 and 5 can be hydraulically connected to one another. This connection can be via at least two short lines (jumpers) 9, 10. The jumpers 9, 10 can be in the following configuration:

(i) the first jumper 10 hydraulically connects an auxiliary mandrel 8 of the WCT of the first underwater injection well 4 to an annulus mandrel 7' of the WCT of the second underwater injection well 55, and (ii) the second jumper 9 hydraulically connects an auxiliary mandrel 8' of the WCT of the second underwater injection well 5 to an annulus mandrel 7 of the WCT of the first underwater injection well 4.

Each one of the jumpers 9, 10 makes it possible to direct a type of fluid received from one of the underwater lines 1, 2 of a first WCT, associated with a first well, to a second WCT, associated with a second well, and vice versa. Thus, in contrast to the WAG systems of the prior art, gas and water can be injected alternately or simultaneously, independently, in any one of the injection wells, whilst each underwater line 1, 2 conveys only one type of fluid (gas or water). In this way, there is greater control of injection, so that contact between water and gas only occurs inside the well. This significantly increases the useful life of the underwater lines 1, 2. Furthermore, it is no longer necessary to inject plugs of inert fluids between injected portions of water and gas, to try and mitigate against hydrate and carbonic acid formation in the underwater lines 1, 2.

In addition, the jumpers 9, 10 make it possible to pass equipment through the underwater lines and underwater injection wells 4, 5, such as pigs.

Figure 2:
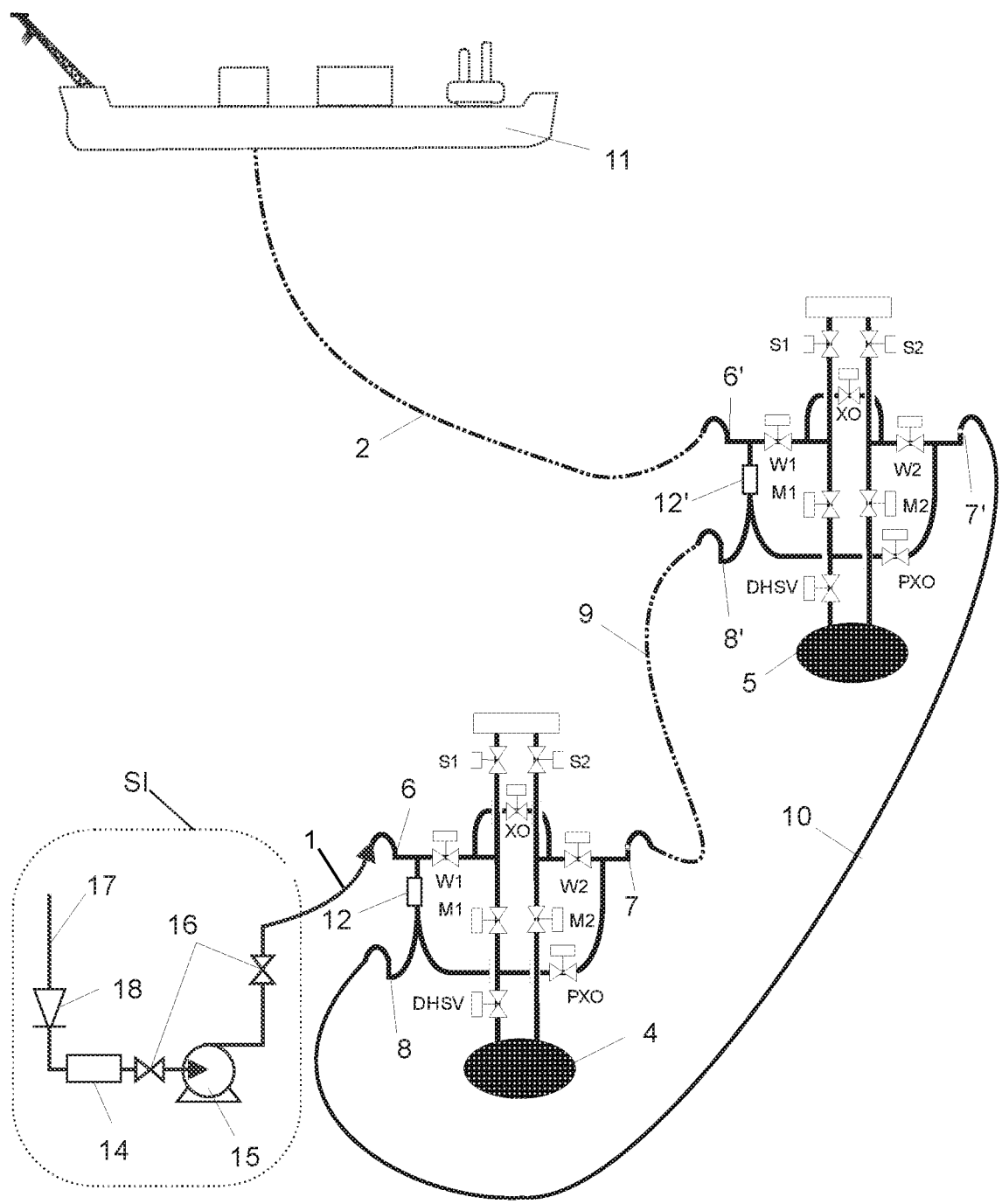
FIG. 2 shows a schematic view of the system according to a second embodiment, additionally comprising an underwater water collection and injection system.

To facilitate understanding, FIGS. 1 and 2 also illustrate the valves usually present in the set comprising production base and wet Christmas tree, usually installed at the top of underwater wells, with:

M1—master injection valve;
M2—annulus valve;
W1—main wing valve;
W2—annulus wing valve;
S1—main swab valve;
S2—annulus swab valve;
XO—cross-over valve;
PXO—pig cross-over valve;
DHSV—downhole safety valve.

Each well 4, 5 may further comprise a control and measurement unit 12, 12' for measuring and controlling the flow rate of entry of water or gas, or other fluids, into the well.

Optionally, according to a second embodiment illustrated in the schematic view in FIG. 2, water is collected, filtered and injected, directly from the sea bottom, in one of the underwater injection wells 4, 5. This is by means of an underwater seawater collection and injection system SI.

The underwater collection and injection system SI is in fluidic communication with the main injection mandrel 6, 6' of the WCT of one of the two adjacent underwater injection wells 4, 5. For example, the underwater seawater collection and injection system SI can be in fluidic communication with the main injection mandrel 6 of the WCT of the first underwater injection well 4, as illustrated in FIG. 2.

The underwater seawater collection and injection system SI can comprise a suction pipe 17, non-return valve 18, filter 14, injection pump 15 and one or more suction valves 16.

The system of either FIG. 1 or FIG. 2 injects only water through a first individual underwater line 1. In FIG. 1 the underwater line 1 hydraulically connects a production unit 11 with the first underwater injection well 4. In FIG. 2 the underwater line 1 hydraulically connects the underwater seawater collection and injection system, SI, with the first underwater injection well 4. Similarly, in each Figure, the system injects only gas through a second individual underwater line 2 that hydraulically connects a production unit 11 with the second underwater injection well 5.

Thus, as already mentioned above, in the present system there is greater control of injection, because each underwater line (and each jumper) only handles water or gas, and not both. This means that contact between water and gas only occurs inside the well, significantly increasing the useful life of the underwater lines. Furthermore, it is no longer necessary to inject plugs of inert fluids between injected portions of water and gas in the underwater lines. Moreover, each underwater line is specifically designed for conveying a single fluid (gas or water), meaning that its cost of manufacture is lower.

In certain arrangements, the first jumper 10 only conveys water from the WCT of the first underwater injection well 4 to the WCT of the second underwater injection well 5. The water can be received from the production unit 11 (first embodiment, FIG. 1) or from the underwater seawater collection and injection system SI (second embodiment, FIG. 2).

Similarly, in those arrangements, the second jumper 9 only conveys gas from the WCT of the second underwater injection well 5 to the WCT of the first underwater injection well 4. The gas is received from the production unit 11 (i.e. both the first and second embodiments presented above).

The present disclosure further provides an underwater method for pressurization of an underwater oil reservoir by independent injection of water and gas. The method can comprise the step of injecting at least one of water and gas in at least one underwater injection well 4, 5 of a set formed from at least two underwater injection wells 4, 5. At least one of the underwater injection wells 4, 5 is linked to a production unit 11. This can be by means of an individual underwater line 1, 2 that is connected to the respective underwater injection well 4, 5, via a main injection mandrel 6, 6' of the respective wet Christmas tree (WCT) of the well for example.

The method also makes use of the at least two jumpers 9, 10 that hydraulically connect two of the underwater injection wells 4, 5. The first jumper 10 can hydraulically connect an auxiliary mandrel 8 of the WCT of a first underwater injection well 4 to an annulus mandrel 7' of the WCT of a second underwater injection well 5. The second jumper 9 can hydraulically connect an auxiliary mandrel 8' of the WCT of the second underwater injection well 5 to an annulus mandrel 7 of the WCT of the first underwater injection well 4.

In addition, the step of injecting at least one of water and gas in at least one underwater injection well 4, 5 can be carried out from the production unit 11 or from an underwater seawater collection and injection system SI in fluidic communication with the at least one underwater injection well 4, 5.

Optionally, the injection step comprises the continuous or alternating injection of water or gas through different individual underwater lines 1, 2 from the production unit 11, water being injected via a first individual underwater line 1 and gas being injected via a second individual underwater line 2. The different individual underwater lines 1, 2 can be connected to different underwater injection wells 4, 5.

Optionally, the method can comprise the additional step of measuring and controlling the flow rate of entry of water or gas into the well by means of the control and measurement unit 12, 12'.

Alternatively, the injection step comprises the continuous or alternating injection of water or gas through different individual underwater lines 1, 2: water being injected via a first individual underwater line 1 from an underwater collection and injection system SI, and gas being injected via a second individual underwater line 2 from the production unit 11. The different individual underwater lines 1, 2 can be connected to different underwater injection wells 4, 5.

The method can additionally comprise the step of directing water injected in the WCT of the first underwater injection well 4 to the second underwater injection well 5 through the first jumper 10.

The method can additionally comprise the step of directing gas injected in the WCT of the second underwater injection well 5 to the first underwater injection well 4 through the second jumper 9.

Accordingly, it is emphasized that numerous technical advantages are obtained by means of the present system, since it:

(i) provides an underwater system for injection of gas and water, for the purpose of improving the recovery factor in deep-water oil production projects;

(ii) provides an underwater injection system that is able to inject a single fluid or more than one fluid simultaneously or alternately;

(iii) makes it possible to carry out operations for recovery of injectivity of the wells by means of operations carried out from a well intervention vessel, for example acidification;

(iv) simultaneously provides a method of injection and ensures more robust flow, by facilitating depressurization of the lines for prevention or even removal of hydrates;

(v) does not present technological obstacles with respect to the equipment used, since the system according to the present invention comprises integration of components and dedicated technologies; and (vi) provides an underwater system for injection of water and gas alternately with a minimum number of connections and risers and without requiring a manifold, significantly reducing the costs and complexity of construction, installation and maintenance;

(vii) makes it possible for each injection pipeline (underwater line) to be responsible for injecting only water or gas, dispensing with the need to inject inert fluid between the portions of water and gas and prolonging the useful life of the pipelines.

Countless variations falling within the scope of protection of the present application are permitted. This reinforces the fact that the present invention is not limited to the particular configurations/embodiments described above. As such, modifications of the above-described apparatuses and methods, combinations between different variations as practicable, and variations of aspects of the invention that are obvious to those of skill in the art are intended to be within the spirit and scope of the claims.

The invention claimed is:

1. System for pressurization of an underwater oil reservoir by independent injection of water and gas, the system comprising:
   at least first and second underwater injection wells, wherein at least one of the first and second underwater injection wells is linked to a production unit by means of an individual underwater line; and
   at least two jumpers:
      a first jumper hydraulically connecting a wet Christmas tree, WCT, of the first underwater injection well to a wet Christmas tree, WCT, of the second underwater injection well, and
      a second jumper hydraulically connecting the wet Christmas tree, WCT, of the second underwater injection well to the wet Christmas tree, WCT, of the first underwater injection well.

2. System according to claim 1, wherein at least one of the first and second underwater injection wells is linked to the production unit by means of the individual underwater line via a main injection mandrel of the respective wet Christmas tree, WCT, of the at least one of the first and second underwater injection wells.

3. System according to claim 1, wherein the first jumper hydraulically connects an auxiliary mandrel of the wet Christmas tree, WCT, of the first underwater injection well to an annulus mandrel of the wet Christmas tree, WCT, of the second underwater injection well.

4. System according to claim 1, wherein the second jumper hydraulically connects an auxiliary mandrel of the wet Christmas tree, WCT, of the second underwater injection well to an annulus mandrel of the wet Christmas tree, WCT, of the first underwater injection well.

5. System according to claim 1, further comprising an underwater seawater collection and injection system, SI.

6. System according to claim 5, wherein the underwater seawater collection and injection system, SI, comprises one or more from the list of a suction pipe, a non-return valve, a filter, an injection pump and a suction valve.

7. System according to claim 5, wherein the underwater seawater collection and injection system, SI, is in fluidic communication with a main injection mandrel of the wet Christmas tree, WCT, of the first or second underwater injection well.

8. System according to claim 5, wherein the underwater seawater collection and injection system, SI, is in fluidic communication with a main injection mandrel of the wet Christmas tree, WCT, of the first underwater injection well.

9. System according to claim 5, wherein the system is configured to inject only water through a first individual underwater line, which hydraulically connects either the production unit or the underwater seawater collection and injection system, SI, with the first underwater injection well.

10. System according to claim 1, wherein the system is configured to inject only gas through a second individual underwater line that hydraulically connects the production unit with the second underwater injection well.

11. System according to claim 1, wherein the first jumper is configured to only convey water from the wet Christmas tree, WCT, of the first underwater injection well to the wet Christmas tree, WCT, of the second underwater injection well.

12. System according to claim 1, wherein the second jumper is configured to only convey gas from the wet Christmas tree, WCT, of the second underwater injection well to the wet Christmas tree, WCT, of the first underwater injection well.

13. System according to claim 1, further comprising at least one measurement unit for management of the amounts of fluid, gas or water, injected in one or both of the first and second underwater injection wells.

14. Method for pressurization of an underwater oil reservoir by independent injection of water and gas, the method using the system of claim 1 and comprising a step of:
  injecting at least one of water and gas in the first and/or second underwater injection well.

15. Method according to claim 14, wherein the step of injecting at least one of water and gas is carried out either from the production unit or from the underwater collection and injection system, SI.

16. Method according to claim 14, wherein the step of injecting at least one of water and gas comprises continuous or alternating injection of water or gas through individual underwater lines from the production unit, water being only injected via a first individual underwater line and gas being only injected via a second individual underwater line.

17. Method according to claim 14, wherein the step of injecting at least one of water and gas comprises continuous or alternating injection of water or gas through individual underwater lines, water only being injected via a first individual underwater line from the underwater collection and injection system, SI, and gas only being injected via a second individual underwater line from the production unit.

18. Method according to claim 14, further comprising a step of directing only water injected in the wet Christmas tree, WCT, of the first underwater injection well to the second underwater injection well through the first jumper.

19. Method according to claim 14, further comprising a step of directing only gas injected in the wet Christmas tree, WCT, of the second underwater injection well to the first underwater injection well through the second jumper.

20. Method according to claim 14, further comprising a step of control and measurement of flow rate of fluid, gas or water, injected in each of the first and second underwater injection wells.

* * * * *